US007356603B2

(12) United States Patent
Singhi

(10) Patent No.: US 7,356,603 B2
(45) Date of Patent: Apr. 8, 2008

(54) INTEGRATED SYSTEM OF LOADS WITH MULTIPLE PUBLIC AWARENESS FUNCTIONS

(75) Inventor: Dilip T. Singhi, Glenview, IL (US)

(73) Assignee: Rauland - Borg Corporation, Skokie, IL (US)

( * ) Notice: Subject to any disclaimer, the term of this patent is extended or adjusted under 35 U.S.C. 154(b) by 68 days.

(21) Appl. No.: 11/392,010

(22) Filed: Mar. 29, 2006

(65) Prior Publication Data

US 2007/0230284 A1 Oct. 4, 2007

(51) Int. Cl.
*G06F 15/16* (2006.01)

(52) U.S. Cl. ...................... 709/229; 709/208; 370/341; 370/340; 370/400; 381/82; 368/46

(58) Field of Classification Search ................ 709/229, 709/208, 225, 209; 370/341, 340, 400; 381/82; 368/46, 47, 52, 59
See application file for complete search history.

(56) References Cited

U.S. PATENT DOCUMENTS 3,938,043 A * 2/1976 Desai ......................... 455/335
4,095,261 A * 6/1978 Rodriguez ................... 360/13
4,189,718 A * 2/1980 Carson et al. ........... 340/384.4
4,387,420 A 6/1983 Singhi et al.
4,490,050 A 12/1984 Singhi
4,677,541 A 6/1987 Singhi
4,744,103 A 5/1988 Dahlquist et al.
4,896,360 A * 1/1990 Knight ........................ 381/82
5,282,180 A 1/1994 Burke et al.
5,345,510 A 9/1994 Singhi et al.
5,442,599 A 8/1995 Burke et al.
6,205,090 B1 3/2001 Blount et al.
6,788,692 B1 * 9/2004 Boudreau et al. ........... 370/400
7,120,692 B2 * 10/2006 Hesselink et al. .......... 709/225
7,143,137 B2 * 11/2006 Maufer et al. .............. 709/205
7,191,331 B2 * 3/2007 Maufer et al. .............. 713/153
2003/0191848 A1 * 10/2003 Hesselink et al. .......... 709/229
2005/0138186 A1 * 6/2005 Hesselink et al. .......... 709/229
2005/0243789 A1 * 11/2005 Dinello et al. .............. 370/341
2005/0268334 A1 * 12/2005 Hesselink et al. ............ 726/11

(Continued)

OTHER PUBLICATIONS

Article entitled: "*Transmitters*" retrieved from http://www.primexwireless.com/schools/products/transmitters on Mar. 20, 2006, Copyright 2005 (pp. 1-6).

(Continued)

*Primary Examiner*—Gary Paumen
(74) *Attorney, Agent, or Firm*—Leydig, Voit & Mayer, Ltd.

(57) ABSTRACT

A signaling system may include two subsystems that share a common wiring backbone and provide public awareness functions. The two subsystems may be a public address system and a master/slave clock system. Remote rooms at the tail end of the wiring backbone include a speaker and a slave clock. The speakers are in communication with a control device through the wiring backbone. The slave clocks are in communication with another control device at the head end of the wiring backbone. The master/slave clock system superimposes its DC power signal and a time correction signal on the wiring backbone. Each slave clock interfaces the wiring infrastructure through a center tap of a speaker transformer which allows the slave clock to be powered and corrected via the speaker wiring infrastructure.

21 Claims, 6 Drawing Sheets

U.S. PATENT DOCUMENTS

2006/0143921 A1* 7/2006 Altenburg et al. ......... 29/897.2
2006/0277314 A1* 12/2006 Hesselink et al. .......... 709/229

OTHER PUBLICATIONS

Product Description page entitled: "*Why SiteSync™ Wireless?*", From *American Time & Signal Company,* Copyright 2006 (1 page).
Product Description page entitled: "*Why an AllSync® System ?*", From *American Time & Signal Company,* Copyright 2006 (1 page).
Product Description page entitled: "*Rotary Drive Wall Clocks*", From *National Time & Signal Corporation,* Bulletin C-332 (Sep. 2004) (1 page double sided).
Product Description page entitled: "*12.5 Remote Antenna*", From *Primex Wireless, Inc.,* (Jan. 2005) (1 page).
Product Description page entitled: "*Rotary Drive Synchronous Clocks*", From *National Time & Signal Corporation,* (no stated date, but no later than applicant's filing date) (1 page).
Product Description page entitled: "*A1200 Multi-Mode, Smart, Correcting Clock*", From *Seasons Clock Systems,* (no stated date, but no later than applicant's filing date) (1 page doubled sided).
Product Description page entitled: "*DC Digital Clock Systems*", From *Industrial Electronic Service, Ltd.,* (no stated date, but no later than applicant's filing date) (1 page double sided).
Product Description page entitled: "*Secondary Wall Clocks*", From *MidWest Time Control, Inc.,* (no stated date, but no later than applicant'filing date) (1 page double sided).
Product Description page entitled: "*Analog Wall Clocks*", From *Lathem,* Form #BRSS-0401 (no stated date, but no later than applicant's filing date) (1 page double sided).
Product Catalog entitled: "*Sapling, Inc. Product Catolog*", From *Sapling Inc.,* (no stated date, but no later than applicant's filing date) (80 pages).

* cited by examiner

| | Intercom Mode | Paging/Audio Program Mode | Idle Mode |
|---|---|---|---|
| Slave Clock Power Signal Path | Active speakers are disconnected | All speakers are connected | Idle speakers are connected |
| Time Correction Signal Path | Active speakers are disconnected | All speakers are connected | Idle speakers are connected |

Fig. 4

INTEGRATED SYSTEM OF LOADS WITH MULTIPLE PUBLIC AWARENESS FUNCTIONS

FIELD OF THE INVENTION

The present invention relates to a system of loads providing multiple public awareness functions, and more particularly to a system and method for installing, operating, powering, and synchronizing a system of loads providing a public awareness function using the existing infrastructure of another such system, which provides a different public awareness function.

BACKGROUND OF THE INVENTION

Public awareness functions are information which is made available to the public with the purpose of creating awareness as to certain conditions or situations. Such functions may include, by way of example only, display of current time, temperature, traffic conditions, as well as intercom and public address.

Public address (PA) systems are often found in buildings where they function to provide building-wide audio controlled from a central location. PA systems may simultaneously announce information to all the available locations or an announcer may choose to limit the announcement to a subset of available locations. These systems are typically characterized by a wiring backbone threaded through the building, connecting a control area to enunciators such as speakers strategically distributed throughout the building.

Because of similar electrical properties among PA systems, intercom systems and paging systems, the wiring backbone in the building may support all three systems. Furthermore, the same wiring system may support distribution of a number of different audio sources, such as music from a CD player, for example.

A plurality of audio amplifiers is located in a central location for connecting to the wiring backbone various audio sources such as microphones, music reproduction devices and intercom/paging units. Each room or area of a building, in turn, likely contains one or more speakers. Existing PA systems typically use 25VAC or 70 VAC balanced constant voltage distribution schemes in order to minimize the speaker wire size necessary to distribute the audio signal to remote rooms. In such systems, a transformer at the output of the amplifier isolates and de-couples the amplifier from other electronics connected to the wiring backbone. Likewise, the loads, such as speakers at the terminal ends of the wiring backbone, are coupled through transformer connections. The output transformer typically steps up the amplifier voltage, while the input transformer steps down the voltage at the speaker terminals. Such systems have been installed extensively in schools, hospitals, airports, train stations, correction facilities, and other buildings where distribution of audio information is necessary.

Typically, many facilities which provide public awareness functions, such as public address or audio paging, also need to display the current time in physically separated areas. To this end, master/slave clock systems are often used to ensure synchronization of individual slave clocks in each room. Master/slave clock systems are those in which a plurality of slave clocks are distributed throughout a given area, but are all controlled from a master clock or controller. Master and slave clocks may be either analog or digital. Typically, each slave clock has its own timing mechanism, but responds to the master for purposes of setting and synchronizing. Thus, for example, after a power failure it is not necessary to reset each individual slave clock, but by manipulating the master clock all of the slaves can be returned to the correct time of day. Master/slave clock systems are useful, if not necessary, in various applications such as schools, hospitals, or airports where a large number of clocks are distributed throughout the facility. In those applications, the slave clock has several advantages: there is no need to set each clock when time is being reset or after power failure, and the slave clocks can be corrected by the master clock to keep them synchronized with the master and thus all telling the same time.

Proper integration of a master/slave clock system requires providing power and correction, or synchronization, signals to each slave clock. In new construction, it's relatively easy to wire a building for a clock system. Installing a clock system into an existing building, however, is difficult and expensive. The wiring usually includes separate lines for power and control, threaded from a master clock to each slave clock. To avoid the expense and trouble of hard wiring, the slave clocks may alternatively be battery powered, while distributing synchronization signals via radio frequency (RF) signals from a master controller. Although wireless installations have the advantage of avoiding the expense and trouble of wiring an existing structure, battery powered slave clocks with RF-distributed synchronization require more maintenance than hard wired systems (e.g., constant changing of batteries) and provide less reliable synchronization because of non-uniform attenuation of the correcting RF signal, which depends on the characteristics of the building. For example, in buildings consisting of steel and thick masonry walls, the signal strength of an RF synchronization signal degrades very rapidly over short distances and the signal may be very weak in the more remote rooms, thus resulting in unreliable time settings.

Consequently, what's needed is a system that can be installed in a building without the expense and trouble of running wiring throughout the building and yet has the reliability of a hard-wired system.

BRIEF SUMMARY OF THE INVENTION

The invention provides a signaling system which may include two subsystems that share a common wiring backbone. Preferably, each of the subsystems provides a public awareness function. The two subsystems may be a public address (PA) system and a master/slave clock system. Each of the subsystems controls a plurality of loads distributed at tail ends of the wiring backbone from a control module at the head end of the wiring backbone. Remote rooms at the tail ends of the wiring backbone include a speaker and a slave clock. A plurality of speakers of the first subsystem provide public awareness functions such as public address/paging, intercom, audio program distribution, class change signaling and tone distribution. Drive signals of the PA subsystem include paging, intercom, music, or other audio source AC signals. A balanced constant AC voltage distribution scheme may be used to distribute the audio drive signals over long speaker wire runs, while minimizing the required wire size. To this end, transformers are employed at the output of each audio amplifier. The speakers, in turn, include a transformer which steps down the voltage at speaker terminals. In order to deliver drive signals to each of the plurality of speakers, the speakers are in communication with a control device, such as an intercom/paging unit, through the speaker wiring infrastructure.

Each of the plurality of slave clocks may be in communication with another control device, such as an atomic to master clock synchronizer unit and a clock interface unit, both located in a control module at the head end of the master/slave clock system. The head end of the system is a centralized location for setting and synchronizing the time displayed in the remote rooms via a correction drive signal delivered through the wiring infrastructure. The clock synchronizer unit also delivers a power drive signal to the clocks through the wiring infrastructure. The correction drive signal is derived from an atomic time signal, which is fetched from an atomic time signal source based on predetermined conditions. The power drive signal is a DC signal.

The master/slave clock system superimposes its DC power signal, as well as the correction signal, on the balanced AC outputs of the audio amplifiers of the PA subsystem. Depending on the particular amplifier, either a center tap output is available or a clock correction inductor with a center tap must be added to the output of an amplifier to interface with the speaker wiring infrastructure for injection of power and correction drive signals. The DC power and correction signals driving the slave clocks in the master/slave clock system can in most cases co-exist with the balanced AC signals from various audio sources that drive the speakers in each remote room. However, when in an intercom mode, the DC power and correction signals of the master/slave clock system are incompatible with the AC signals of the intercom system. In this case, the master/slave clock system is disconnected from the speaker wiring infrastructure. During this mode, a provision is made to power the slave clock for a short duration by an onboard battery or charged capacitor.

Each slave clock includes a clock enhancer, a clock controller, and a clock display. The slave clock interfaces the speaker wiring infrastructure through a center tap of the speaker transformer. The center tap interface allows the clock to receive the correction drive signal and a DC power drive signal from the control module, while ignoring the AC drive signals from the intercom/paging unit.

BRIEF DESCRIPTION OF THE SEVERAL VIEWS OF THE DRAWING(S)

FIG. 4 is a table of operating states or modes of operation that allow the master/slave clock system to co-exist on the same wiring infrastructure with the PA system;

Figure 3:
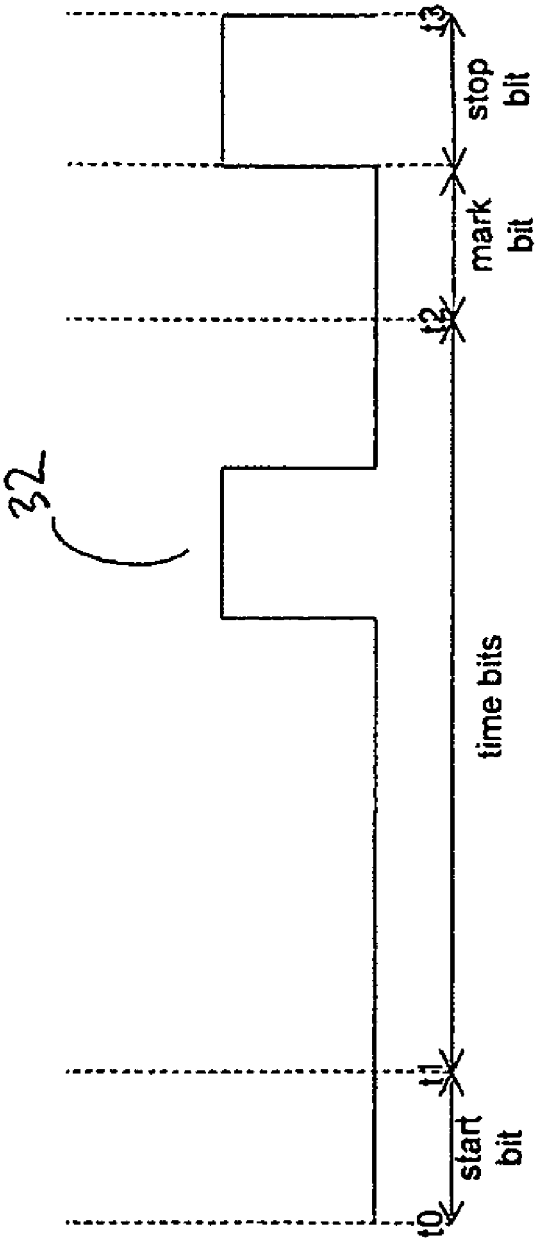
FIG. 3 is a timing diagram showing the signals of the mater/slave clock system patched into the wiring infrastructure in FIG. 2.
Figure 5:
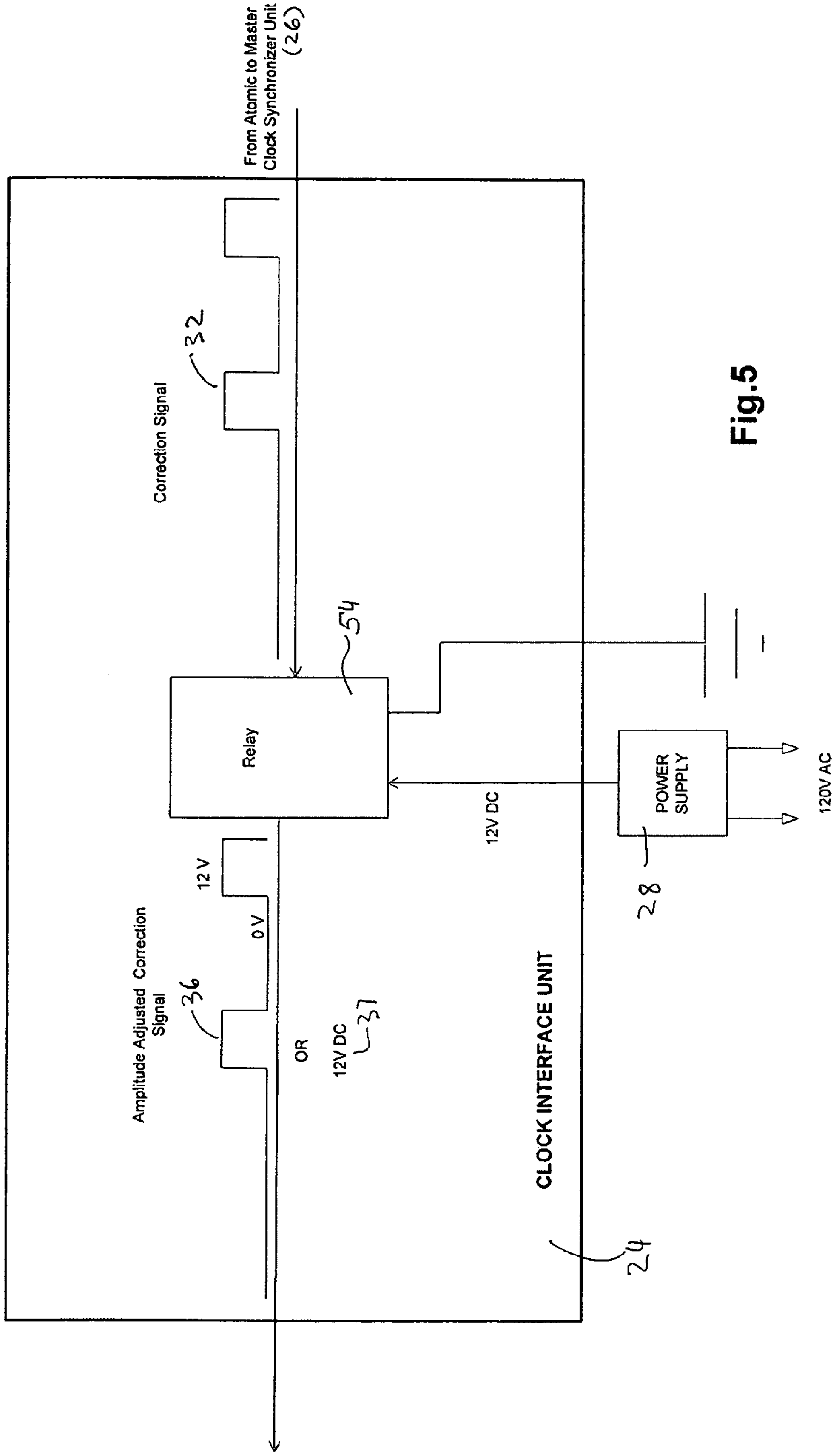
Figure 6:
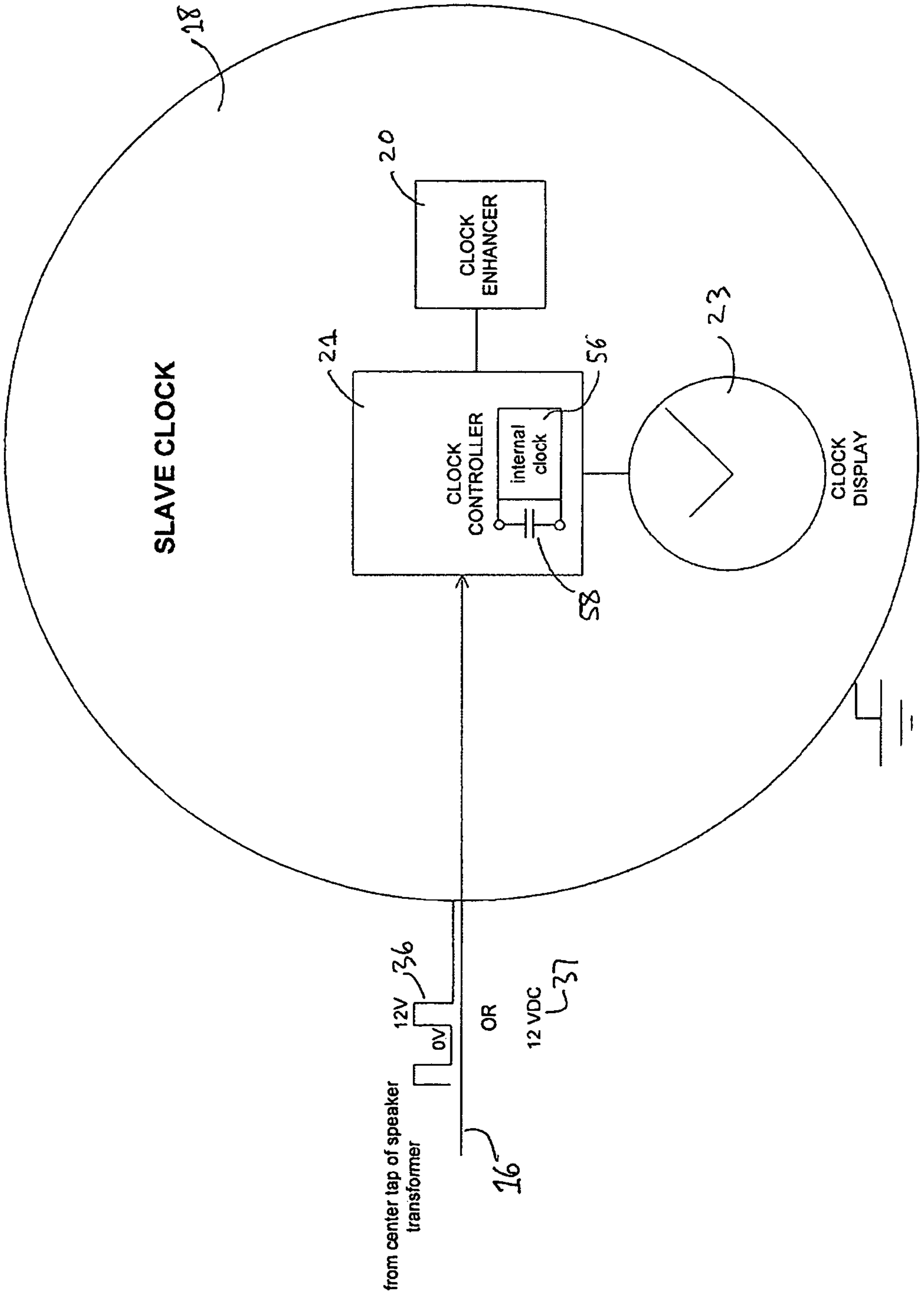

FIG. 5 is a detailed schematic diagram of the interface at the head end of the master/slave clock system that patches the signals illustrated in FIG. 3 into the wiring infrastructure; and FIG. 6 is a detailed schematic diagram of a slave clock at each tail end of the wiring infrastructure in which an interface to the slave clock patches into the wiring system without interfering with the primary system, which is a PA system in the illustrated embodiment.

DETAILED DESCRIPTION OF THE INVENTION

Figure 1:
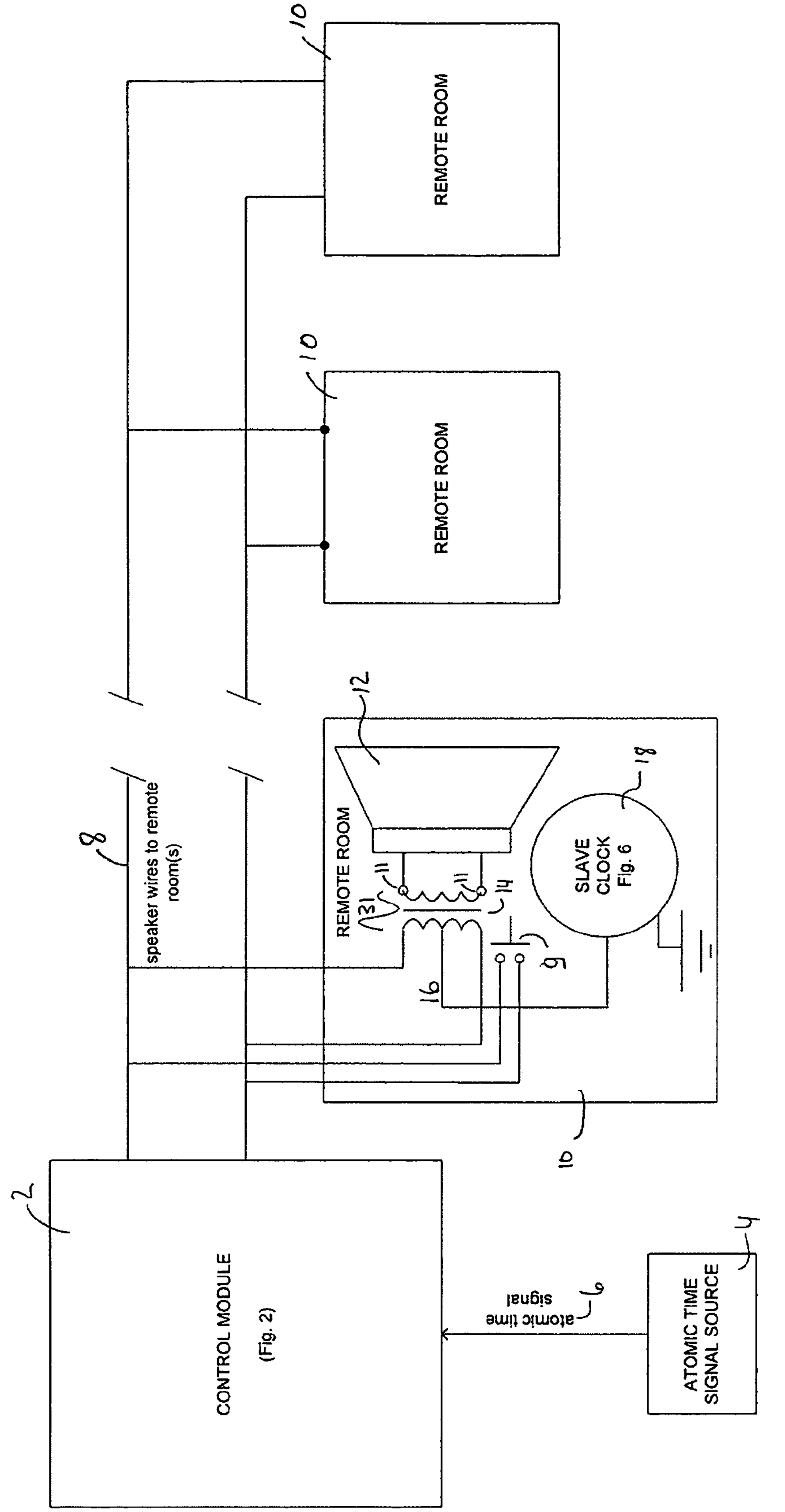
FIG. 1 is a schematic diagram of an installation for a master/slave clock system according to the invention that takes advantage of an existing infrastructure of wiring, which in the case of the illustration is a public address (PA) system.

Turning to the drawings, wherein like reference numbers refer to like elements, a signaling system in FIG. 1 comprises two subsystems that share a common wiring backbone. One of the subsystems is a DC-powered system making use of a balanced AC subsystem's wiring backbone that is already in place. Each of the two subsystems makes use of the wiring backbone in a manner that may not always be compatible with co-existence of signals of the other subsystem. In order to add the DC-powered system to the wiring backbone, the DC-powered system makes use of the wiring backbone while the AC system is idle. A further refinement allows the DC-powered subsystem to share the wiring backbone when the AC system is operating in certain modes which are immune from superimposed signals of the DC-powered subsystem. For those modes of operating the AC system that are sensitive to superimposed signals, the DC-powered system is disabled or blocked form the backbone. When the DC-powered system is disabled, its loads distributed throughout the building must operate on their own. When the DC-powered system is a master/slave clock system, the slave clocks run on battery power when the system is disconnected from the wiring backbone. If the time the DC-powered system is disabled exceeds a predetermined capacity of the battery backup, then the slave clocks power down and wait for the DC-powered system to regain control of the wiring backbone. When the DC-powered system regains control, it sends any necessary correction signals to the slave clocks to both bring them to the correct time and to synchronize them to one another. Thereafter, the DC-powered system periodically provides a correction signal to the slaves to keep the time correct. Preferably, each of the subsystems provides a public awareness function.

As illustrated in FIG. 1, the two subsystems are a public address (PA) system and a master/slave clock system. Each of the subsystems controls a plurality of loads distributed at tail ends of the wiring backbone from a control module at the head end of the wiring backbone. In the illustrated embodiment, each of the rooms 10 includes a speaker 12 and a slave clock 18.

A plurality of speakers 12 of the first subsystem provide public awareness functions such as public address/paging, intercom, audio program distribution, class change signaling and tone distribution. A suitable example of a speaker 12 is a commercially available Rauland-Borg model number USO188. Speakers 12 typically comprise a speaker transformer 14 for use in a 25 VAC or 70 VAC balanced constant voltage audio distribution scheme to couple audio drive signals 31 to speakers 12 and to step down the voltage of the audio drive signals 31 across a speaker wiring backbone or infrastructure 8 at speaker terminals 11. In the illustrated embodiment, drive signals 31 comprise paging, intercom, music, or other audio source AC signals.

In order to deliver drive signals 31 to each of the plurality of speakers 12, speakers 12 are in communication with a control device, such as an intercom/paging unit 22 (FIG. 2) in the control module 2, through the speaker wiring infrastructure 8. Exemplary speaker wiring infrastructure 8 may comprise a balanced audio wiring scheme. A balanced audio wiring scheme typically employs three conductors. Typically, two conductors are used to carry the out-of-phase portions of a source signal and a third conductor is used as a common ground reference. The balanced audio input reconstructs the source signal from a voltage difference between the two signal-carrying wires. When equal amplitude in-phase components of an interfering signal are present on the signal-carrying wires (i.e. when the noise signals are common mode), the interfering signal will be canceled out at the balanced input because the difference between the noise signals will amount to zero. Hence, a balanced audio wiring scheme may be used to reject the interference from electrical noise sources.

Figure 2:
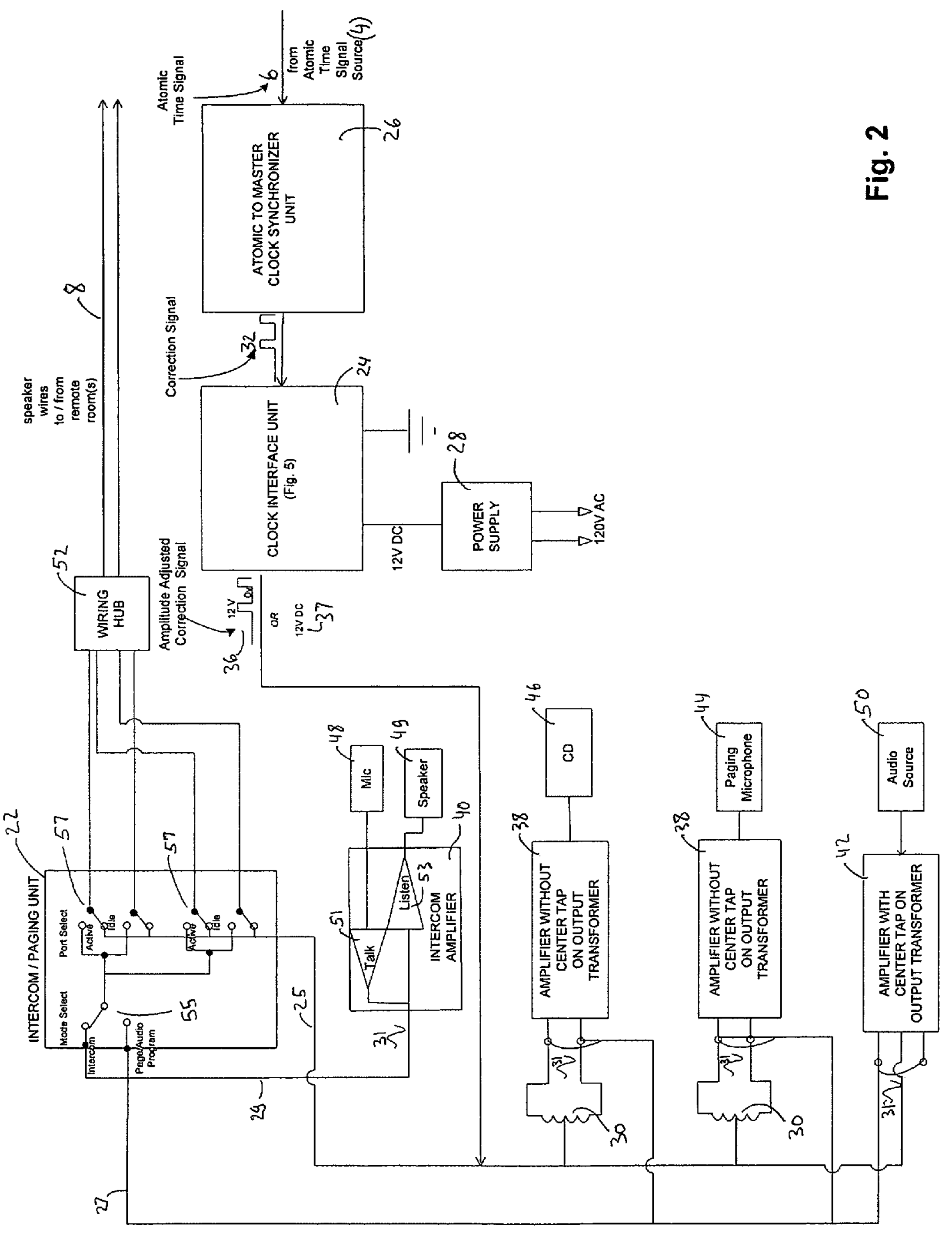
FIG. 2 is a schematic diagram illustrating details of an interface for patching signals of the master/slave clock system of FIG. 1 from a head end of the system into the existing wiring infrastructure so as to not interfere with the operation of the system the wiring primarily supports, which in the illustrated embodiment is a PA system.

In life safety system applications, such as in schools for example, the wiring infrastructure 8 may comprise running four signal carrying wires (two pairs) to each remote room 10, one pair for the speaker 12 and another pair for the "call for help" or intercom switch 9. In addition, the wiring infrastructure 8 may comprise a ground wire which can be either one of the intercom switch 9 wires or earth ground. In paging only applications, for example in hospitals or airports, the wiring infrastructure 8 may comprise running only one pair of appropriate gauge signal carrying wires, as well as a ground wire, to each speaker 12. In the illustrated embodiment, each of the plurality of slave clocks 18 is in communication with another control device, such as an atomic to master clock synchronizer unit 26 and a clock interface unit 24, both located in control module 2 at the head end of the master/slave clock system and discussed below in connection with FIG. 2. The head end of the system is a centralized location for setting and synchronizing the time displayed in the remote rooms 10 via a correction drive signal 36 (FIG. 2). A suitable example of a slave clock 18 is a commercially available Rauland-Borg 12 inch synchronized clock model number TCCKAN12.

As illustrated in FIG. 2, the correction drive signal 36 is derived from an atomic time signal 6, which is fetched from an atomic time signal source 4. Atomic time signal 6 is a universal reference signal relied upon by the master/slave clock system to provide the correct time. The atomic time is received at the head end of the master/slave clock system and is used as a base time for controlling each of the plurality of slave clocks 18. In one embodiment, atomic time signal source 4 comprises an atomic clock located at the National Institute of Standards and Technology (NIST) in Boulder, Colo. The NIST broadcasts the atomic time signal 6 through the Internet, radio frequency (RF), as well as through telephone lines. If fetched via the Internet, the atomic time signal 6 may be in any of NIST Internet Time Service (ITS) formats which represent Coordinated Universal Time (UTC), such as Daytime Protocol RFC-867, Network Time Protocol RFC-1305, or Time Protocol RFC-868.

To provide centralized management and distribution of intercom, paging, audio programs, and other communication functions, the control module 2 includes an intercom/paging unit 22, as illustrated in FIG. 2, connected to audio sources 44, 46, 48, 49, and 50 through amplifiers 38, 40, and 42. A suitable example of an intercom/paging unit 22 may be commercially available TELECENTER® units from the Rauland-Borg Corporation, such as TELECENTER® DIRECTOR, TC 1100, TC IV, TC V, TC VI, or TC ICS. As discussed above, a constant AC voltage distribution scheme may be used to distribute the audio information over long speaker wire runs, while minimizing the required wire size. To this end, transformers are employed at the output of each audio amplifier 38, 40, and 42. The output transformers step up the amplifier output voltage in order to minimize the output current necessary to deliver the rated power at each speaker 12. As stated above in connection with FIG. 1, the speakers 12, in turn, include the transformer 14 which steps down the voltage at speaker terminals 11.

In order to provide paging and audio program distribution functions, a paging microphone 44, a CD player 46, and an audio source 50 are connected to amplifiers 38 and to an amplifier 42 respectively. The master/slave clock system superimposes its DC power signal 37, as well as a correction signal 36, on the AC outputs of these amplifiers. Depending on the particular amplifier, either a center tap output is available or a clock correction inductor 30 with a center tap must be added to the output of an amplifier to interface with the speaker wiring infrastructure 8 for injection of drive signals 36 and 37. Both approaches are illustrated in FIG. 2. For example, amplifiers 38 do not have a center tap. However, the amplifier 42, which is connected to an audio source 50, has an accessible center tap at its output transformer. Hence, the clock correction inductor 30, having a center tap, is used to interface with the output transformer of amplifiers 38 in order to inject the driving signals 36 and 37 on the idle line 25 and on the paging/audio program line 27. Examples of audio amplifiers without a center tap at the output transformer are Rauland-Borg models MPA250, while suitable examples of amplifiers with a center tap at the output transformer may comprise Rauland-Borg model numbers FAX120, DAX60, or DAX120.

When the wiring infrastructure 8 comprises a balanced wiring scheme, equal amplitude in-phase images of the correction and DC power drive signals 36 and 37 are superimposed on the signal carrying wires. These signals will appear as common mode noise at the balanced input of the speaker transformer 14 and therefore will be rejected at the speaker 12 (FIG. 1).

In order to provide the intercom functionality, a microphone 48 and a speaker 49 are connected to a two-way intercom amplifier 40. The microphone 48 is connected to the talk amplifier 51 of the two-way intercom amplifier 40 in order to transmit the intercom signals to a remote room 10 through the intercom line 29. Similarly, to receive the intercom signals from a remote room 10 through the intercom line 29, the speaker 49 is connected to a listen amplifier 53 of the two-way intercom amplifier 40.

In keeping with the invention, the DC power and correction signals 37 and 36 driving the slave clocks 18 in the master/slave clock system can in most cases co-exist with the AC signals 31 from various audio sources that drive speakers 12. However, there are cases in which the AC drive signals 31 on the speaker wiring infrastructure 8 are incompatible with the DC power and correction drive signals of the master/slave clock system. In the illustrated embodiment, there are several modes of AC operation as suggested by the table in FIG. 4. The speakers 12 are alternatively driven as part of an intercom system or a paging/audio program system. When in an intercom mode, the DC power and correction signals of the master/slave clock system are incompatible with the AC signals of the intercom system. In this case, the master/slave clock system is disconnected from the speaker wiring infrastructure 8.

In the illustrated embodiment this is accomplished by including a mode select switch 55 and port select switches 57 in the intercom/paging unit 22. As illustrated in FIG. 2, the mode select switch 55 is used to switch the PA subsystem between a paging/audio program mode and an intercom mode. In turn, one or more port select switches 57 are used to select one or more rooms 10 for delivery of audio drive signals 31 by switching from an idle position to an active position. As illustrated in FIG. 2, when the PA subsystem is in the intercom mode, a single room 10 (i.e. a single speaker 12) connects to the intercom amplifier 40. When the PA subsystem is in the paging/audio program mode, a group of rooms 10 (or speakers 12) connect to amplifiers 38 or 42 according to which of the sources 44, 46, or 50 are being distributed. Thus, when the PA subsystem is in the paging/audio program mode all speakers 12 have a connection to the clock power and correction signals 37 and 36. Specifically, in the paging/audio program mode, the active speakers 12 are connected to the power and correction signals 37 and 36 through the active amplifiers, while the idle speakers 12 are connected to the power and correction signals 37 and 36 through the idle line 25. During the intercom mode, only the idle speakers have a connection to the clock power and correction signals 37 and 36 through the idle line 25, while the active speakers are powered through a battery or a storage capacitor 58, as further discussed below in connection with FIG. 6.

In the illustrated embodiment, the outputs of each port select switch 57 are connected to the wiring hub 52 in order to distribute the audio driving signals 31 to remote rooms 10 through the speaker wiring infrastructure 8.

To provide time synchronization and supply power through the speaker wiring infrastructure 8, the control module 2 further comprises an atomic to master clock synchronizer unit 26 and a clock interface unit 24, which control the plurality of slave clocks 18. Specifically, the atomic to master clock synchronizer unit 26 fetches the atomic time signal 6 from the atomic time signal source 4 and sets its own time and date based on the local time zone. Then, based on the correction scheme employed in the clocks 18, the atomic to master clock synchronizer unit 26 generates an appropriate correction signal 32 in order to controllably synchronize the clocks 18 by signaling the beginning and an end of the transmission of the current time. As discussed above, if atomic time signal 6 is fetched via the Internet, it may be in any of NIST Internet Time Service (ITS) formats which represent Coordinated Universal Time (UTC). The correction signal 32 may comprise the current time bits, as well as control bits to signal the clocks 18 that current time is being transmitted. Clocks 18 may employ a number of different correction schemes for the correction signal 32, for example, such as those compatible with slave clocks manufactured by Dukane (e.g., models 24030, 24BF209, 24ISC series and others), Rauland-Borg 2460 series and Digital Secondary clocks, IBM secondary clocks, as well as other correction schemes employed by various manufacturers.

One possible correction scheme, as further illustrated in FIG. 3, is for the correction signal 32 to commence when the current time is at zero minutes and zero seconds (hence the clocks 18 will adjust the seconds) and to comprise a series of low frequency inaudible pulses, for example at a rate of 1 pulse per 0.5 seconds or 2 baud. Hence, each pulse of the correction signal 32 is of a predetermined duration based on the frequency, or baud rate, of the correction signal 32. In the illustrated embodiment, the correction signal 32 may comprise one start bit, five bits of the time information with most significant bit (MS) transmitted first and least significant bit (LS) transmitted last, as well as one mark bit and one stop bit. In the illustrated embodiment, the mark bit has the same level as the start bit. This particular correction scheme provides a 0.5 second start pulse, followed by 5 bits of time information in 2.5 seconds, a 0.5 second mark bit and a 0.5 second stop pulse.

To synchronize the slave clocks 18, the atomic to master clock synchronizer unit 26 generates the correction signal 32 from atomic time signal 6 based on predetermined conditions. By way of example only, such conditions may include generating the correction signal 32 on the hour after fetching the atomic time signal 6. The atomic time signal 6 may be fetched at a predetermined time each day, upon restoration of power after a power failure, after a daylight savings time change, upon initial system power up, upon disconnection of the atomic to master clock synchronizer from the programming software, or upon activating a manual time update from the front panel button. The atomic to master clock synchronizer unit 26 is not limited to synchronizing to an external atomic clock. In a similar manner, correction signal 32 may be generated based on local digital or analog master clocks that drive the atomic to master clock synchronizer unit 26. A suitable example of an atomic to master clock synchronizer is Rauland-Borg model TCAMCS.

As illustrated in FIG. 5, to inject the power and correction signals onto the wiring infrastructure 8 for powering and correcting the clocks 18, the clock interface unit 24 comprises a relay 54 connected to the DC power supply 28 and to the atomic to master clock synchronizer unit 26. The correction signal 32 from the atomic to master clock synchronizer unit 26 activates the relay 54. Therefore, when the correction signal 32 is present, the output of the clock interface unit 24 is an amplitude adjusted pulse train 36 that duplicates the correction signal 32 but has a voltage range of zero to 12 volts. When the correction signal 32 is not present, the output of the clock interface unit is a 12 volt DC power signal 37 which powers the slave clocks 18. The relay 54 may be a Single Pole Double Throw (SPDT) type relay.

As illustrated in FIG. 6, each slave clock 18 includes a clock enhancer 20, a clock controller 21, and a clock display 23. The clock enhancer 20 activates a software function of the clock controller 21 which allows the slave clock 18 to be powered and corrected through the wiring infrastructure 8. In the illustrated embodiment, the clock enhancer 20 may comprise a plug-in resistor network module. As further illustrated in FIGS. 1 and 6, each slave clock 18 interfaces the speaker wiring infrastructure 8 through the center tap 16 of the speaker transformer 14. The center tap interface allows the clocks 18 to receive the correction drive signal 36 and a DC power drive signal 37 from the control module 2, while ignoring the AC drive signals 31 from the intercom/paging unit 22. Specifically, the slave clock 18 may represent a resistive load connected in series with a primary winding of the speaker transformer 14 through the center tap 16. This combination may act as a low-pass filter thereby filtering out or significantly reducing the level of the AC driving signals 31 at each slave clock 18, while passing the DC power signal 37 and the correction signal 36 to the clock controller 21.

When the clock power and correction signal paths are connected, the clock controller 21 receives a DC power signal for powering the internal clock 56, which keeps the time during normal operation. The clock controller 21 is capable of setting the time upon receipt of the correction signal 36 from the clock interface unit 24. The time setting function of the clock controller 21 remains deactivated when the power signal 37 remains at 12 VDC. However, when the 12 VDC signal pulses to a 0V signal level for a predetermined duration of time, the clock controller 21 may recognize this as a start bit pattern indicating the presence of correction signal 36 and will set the time to a predetermined value transmitted by the correction signal 36. The clock controller 21 keeps track of the amount of time it takes the clock to move its hands at an increased rate of movement and sets the time according to the value of the time bits of correction signal 36 (derived from the atomic time signal 6), as adjusted by the time it takes the clock 18 to move its hands. The rate of movement of the hands is predetermined, hence the clock controller 21 is able to calculate the necessary time adjustment interval.

The clock controller 21 includes a storage capacitor 58 to allow the clock 18 to temporarily operate when the power signal 37 is not present. The power signal 37 is not present during the synchronization process of the clock 18, during power failures, when the control module 2 is powered down, and when the speaker 12 is activated in the intercom mode. Hence, the clock controller 21 may comprise an internal clock 56 which is powered from a storage capacitor 58 during the absence of the power signal 37. The clock 18 is therefore able to stop the hands of clock display 23 while using the internal clock 56 to keep the time for several hours, thus conserving the charge on capacitor 58. If the power signal 37 is reconnected while capacitor 58 remains charged, the clock 18 is able to self-correct to the current time by restoring the position of the hands to the internally kept time. Alternatively, when the power signal 37 is disconnected, the clock 18 may use the capacitor 58 to move the hands of display 23 for a few minutes, while keeping the time via the internal clock 56. Similarly, if the power is restored while the capacitor 58 remains charged, clock 18 is able to self-correct to the current time by restoring the position of the hands of display 23 to the internally kept time.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system in a building for providing public awareness functions comprising:

a first subsystem of loads comprising a plurality of loads distributed in the building for providing a first public awareness function, where each of the plurality of loads of the first subsystem is in communication with a first control device by way of a wiring infrastructure to deliver drive signals to the loads;

a second subsystem of loads comprising a plurality of loads distributed in the building for providing a second public awareness function; where each of the plurality of loads of the second subsystem is in communication with a second control device;

the second control device including an interface for tapping into the wiring infrastructure to deliver drive signals to the plurality of loads of the second subsystem; and each of the loads of the second subsystem including an interface to the wiring infrastructure for receiving the drive signals from the second control device while ignoring the drive signals from the first control device.

2. The system of claim 1, wherein at least one load of the plurality of loads of the first subsystem comprises a speaker.

3. The system of claim 1, wherein at least one load of the plurality of loads of the second subsystem comprises a clock.

4. The system of claim 1, wherein the drive signals to the plurality of loads of the first subsystem are coupled to at least one of the plurality of loads of the first subsystem by a transformer.

5. The system of claim 1, wherein the second control device further comprises a synchronizer to synchronize the loads of the second subsystem through the wiring infrastructure, the synchronizer generating a control signal comprised of a first signal level and a second signal level, the second signal level being of predetermined duration; and wherein at least one of the plurality of loads of the second subsystem further comprises a setting component for responding to the first signal level to remain deactivated and for responding to the second signal level to set the time to a predetermined value.

6. The system of claim 1, wherein the second control device further comprises a synchronizer to synchronize the loads of the second subsystem through the wiring infrastructure, the synchronizer operating based on predetermined conditions.

7. In a system of a first type of loads distributed in a building for providing one or more public awareness functions, wherein the first type of loads is driven by a first control device by way of a wiring infrastructure in the building, a method for installing in the building and operating a second type of loads providing one or more public awareness functions comprising:

tapping into a head end of the wiring infrastructure connected to the first control device in order to connect a second control device to the wiring infrastructure;

tapping into a terminal end of the wiring infrastructure connected to at least one of the first type of loads in order to connect at least one of the second type of loads;

delivering drive signals from the second control device to the second type of loads by way of the wiring infrastructure; and interrupting the drive signals from the second control device when drive signals from the first control device are not compatible with the drive signals from the second control device.

8. The method of claim 7, wherein at least one of the second type of loads is a clock.

9. The method of claim 8, wherein the drive signals from the second control device include a power signal and a control signal to synchronize the clocks to a reference clock after system power has been interrupted.

10. The method of claim 8, wherein the drive signals comprise a power signal and a control signal, the control signal comprising a first signal level and a second signal level, the second signal level being of a predetermined duration, the method further comprising synchronizing the clocks to a reference clock by responding to the second signal level to set the time to a predetermined value.

11. The method of claim 8 further comprising synchronizing the clocks to a reference clock based on predetermined conditions.

12. The method of claim 7, wherein at least one of the first type of loads is a speaker.

13. The method of claim 7, wherein the drive signals from the first control device are coupled to at least one of the first type of loads by a transformer.

14. A system of loads distributed in a building for providing public awareness functions, the system comprising:

a first subsystem of loads comprising a plurality of loads distributed in the building for providing a first public awareness function, where each of the plurality of loads is in communication with a first control device by way of a wiring infrastructure to provide drive signals to the loads;

a second subsystem of loads comprising a plurality of loads distributed in the building for providing a second public awareness function;

each of the plurality of loads of the second subsystem tapping into a terminal end of the wiring infrastructure associated with one of the plurality of loads of the first subsystem;

a second control device of the second subsystem tapping into a head end of the wiring infrastructure for powering the loads of the second subsystem by way of wiring common to that supporting the drive signals of the first control device; and circuitry for electrically disconnecting the plurality of loads of the second subsystem from the second control device when the drive signals from the first control device are not compatible with drive signals from the second control device.

15. The system of claim 14, further comprising a synchronizer for synchronizing the loads of the second subsystem through the wiring infrastructure, the synchronizer operating based on predetermined conditions.

16. The system of claim 14, wherein the second control device further comprises a synchronizer to synchronize the loads of the second subsystem through the wiring infrastructure, the synchronizer generating a control signal comprised of a first signal level and a second signal level, the second signal level being of predetermined duration, and wherein each of the plurality of loads of the second subsystem further comprises a setting component for responding to the first signal level to remain deactivated and for responding to the second signal level to set the time to a predetermined value.

17. The system of claim 14, wherein at least one of the plurality of loads of the first subsystem comprises a speaker.

18. The system of claim 14, wherein at least one of the plurality of loads of the second subsystem comprises a clock.

19. The system of claim 18, wherein the clock further comprises circuitry to stop its hands while temporarily keeping the time after being electrically disconnected from the second control device and to restore the position of the hands to an internally kept time after being electrically reconnected to the second control device.

20. The system of claim 18, wherein the clock further comprises circuitry to temporarily move its hands and temporarily keep the time after being electrically disconnected from the second control device and to restore the position of the hands to an internally kept time after being electrically reconnected to the second control device.

21. The system of claim 14, wherein the drive signals are coupled to at least one of the plurality of loads of the first subsystem by a transformer.

* * * * *